US011017434B2

(12) United States Patent
Garcia Galvao Almeida et al.

(10) Patent No.: US 11,017,434 B2
(45) Date of Patent: May 25, 2021

(54) INTERACTIVE PRODUCT DISPLAY SYSTEM FOR PROVIDING TARGETED ADVERTISEMENTS

(71) Applicant: NEC Laboratories Europe GmbH, Heidelberg (DE)

(72) Inventors: Miguel Garcia Galvao Almeida, Ettlingen (DE); Benjamin Hebgen, Heidelberg (DE); Ernoe Kovacs, Stuttgart (DE)

(73) Assignee: NEC CORPORATION, Tokyo (JP)

( * ) Notice: Subject to any disclaimer, the term of this patent is extended or adjusted under 35 U.S.C. 154(b) by 365 days.

(21) Appl. No.: 16/120,331

(22) Filed: Sep. 3, 2018

(65) Prior Publication Data
US 2020/0074506 A1 Mar. 5, 2020

(51) Int. Cl.
*G06Q 30/02* (2012.01)
*H04Q 9/00* (2006.01)
*G01S 5/14* (2006.01)
*G06N 20/00* (2019.01)

(52) U.S. Cl.
CPC .......... *G06Q 30/0261* (2013.01); *G01S 5/14* (2013.01); *G06N 20/00* (2019.01); *G06Q 30/0201* (2013.01); *H04Q 9/00* (2013.01); *H04Q 2209/40* (2013.01)

(58) Field of Classification Search
None
See application file for complete search history.

(56) References Cited

U.S. PATENT DOCUMENTS

| 2016/0047887 | A1* | 2/2016 | Niewczas | G01S 5/14 342/458 |
| 2016/0086191 | A1* | 3/2016 | Fonzi | G06Q 30/0269 705/304 |
| 2017/0053330 | A1* | 2/2017 | Smith | H04W 4/021 |
| 2017/0140427 | A1* | 5/2017 | Bocanegra | G06Q 30/0255 |
| 2018/0060909 | A1* | 3/2018 | Adams | G06Q 20/10 |
| 2018/0374127 | A1* | 12/2018 | Walden | G01G 19/4144 |

OTHER PUBLICATIONS

Ashley Carman, "Walmart wants to put sensors on everything so it can automatically order you stuff", available on May 6, 2017, retrieved from https://www.theverge.com/circuitbreaker/2017/5/5/15556564/walmart-sensors-patent-internet-of-things, (Year: 2017).*
Prateek Jain, et al., "uBeacon: Configuration based Beacon Tracking", 2016 IEEE International Conference on Pervavise Computing and Communications Work in Progress, Dec. 2016, pp. 1-4.

* cited by examiner

*Primary Examiner* — Sam Refai
(74) *Attorney, Agent, or Firm* — Leydig, Voit & Mayer, Ltd.

(57) ABSTRACT

A method for generating data indicative of a customer interaction with a product on display includes acquiring, by one or more sensors attached to a product on display in a product display area, sensor data; wirelessly transmitting the sensor data to at least one wireless receiver located in the vicinity of the product display area; and transmitting the sensor data from the at least one wireless receiver to a computer. The method further includes executing, by the computer, a machine learning algorithm in order to determine that a potential customer has interacted with the product on display and to generate insights about an interaction between the customer and the product on display.

16 Claims, 3 Drawing Sheets

INTERACTIVE PRODUCT DISPLAY SYSTEM FOR PROVIDING TARGETED ADVERTISEMENTS

FIELD

The present invention relates to targeted advertising, and more specifically, to a system for providing targeted and personalized advertising to a user based on a user's interaction with products displayed on a shelf.

BACKGROUND

Advertising companies and retailers can both benefit by improving the shopping experience of customers and potential customers. To that end, such advertisers and retailers aim to make the shopping experience more personalized and adaptive. Furthermore, a more personalized and adaptive shopping experience can benefit customers and potential customers by filtering out advertisements and other information not relevant to their interests and instead providing advertisements and other information they find interesting.

SUMMARY

In an embodiment, the present invention provides a method for generating data indicative of a customer interaction with a product on display. The method includes acquiring, by one or more sensors attached to a product on display in a product display area, sensor data; wirelessly transmitting the sensor data to at least one wireless receiver located in the vicinity of the product display area; and transmitting the sensor data from the at least one wireless receiver to a computer. The method further includes executing, by the computer, a machine learning algorithm in order to determine that a potential customer has interacted with the product on display and to generate insights about an interaction between the customer and the product on display.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
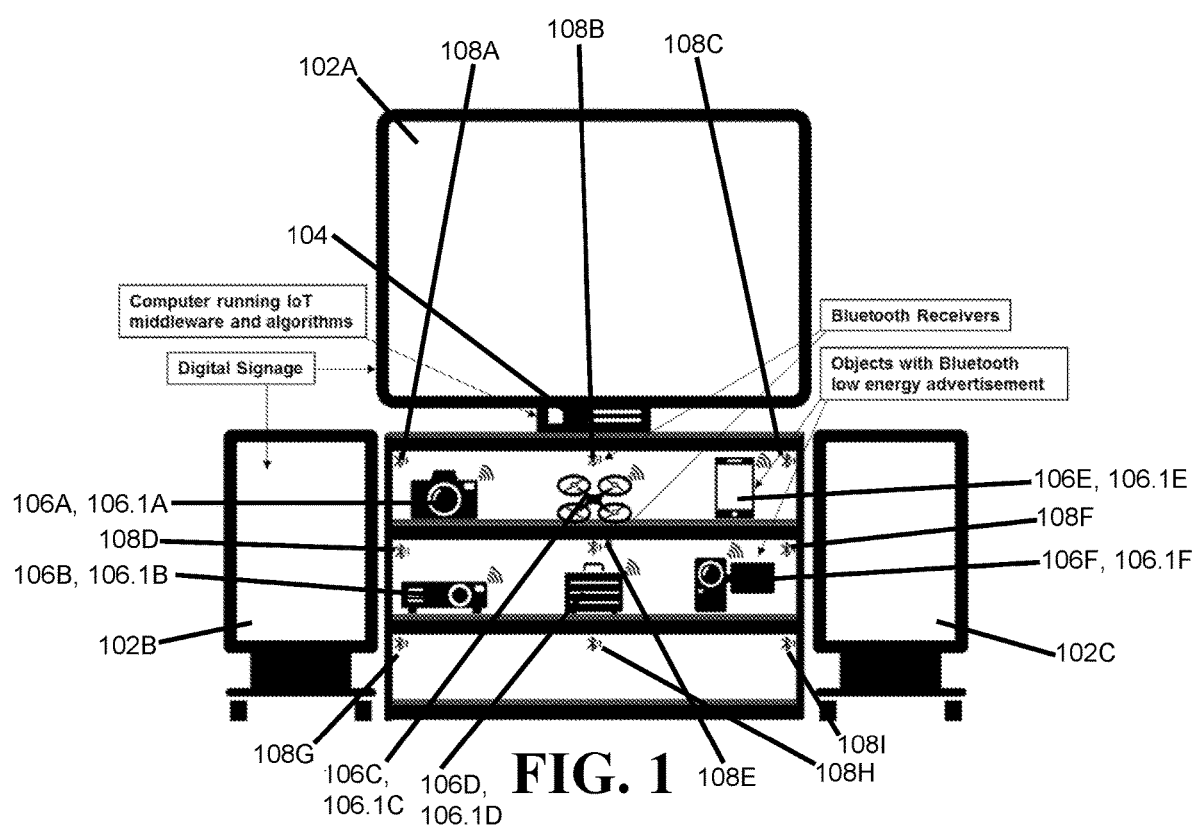
FIG. 1 depicts a system according to an embodiment of the invention for generating data pertaining to a customer-product relationship and for providing targeted advertisements to the customer.

Retailers and advertisers aim to provide differentiating solutions with pre-integrated display signage and item monitoring and tracking. Embodiments of the present invention provide solutions for generating data pertaining to a relationship between a product and a particular customer and for providing targeted and dynamic advertisements to the customer. Embodiments of the present invention provide solutions for determining whether a customer has interacted with one or more products on display, ascertaining information pertaining to such interaction, and utilizing the ascertained information in order to determine appropriate advertisements to display to the user. Therefore, embodiments of the present invention provide improvements over prior art methods of providing advertisements by improving the accuracy with which the interest levels of particular customers with respect to products on display can be determined and by using such information to provide advertisements of increased relevance to such customers. Embodiments of the present invention thereby enable retailers and advertisers to improve the effectiveness of their advertising campaigns and thus increase revenue while simultaneously improving the shopping experience of customers and potential customers.

Embodiments of the present invention provide systems for generating data pertaining to a relationship between a product and a particular customer and for providing targeted and dynamic advertisements to the customer. Systems according to such embodiments of the invention include one or more physical product display areas, e.g. one or more shelves, a plurality of physical products being displayed in the one or more product display areas, an integrated circuit (IC) attached to each of the plurality of products, and one or more wireless communication hubs configured to exchange wireless communications with the ICs attached to each of the plurality of products. The one or more wireless communication hubs can be positioned either at or in the vicinity of the one or more physical product display areas. In addition, the systems according to such embodiments further include a machine having a processor configured to receive data provided by the one or more wireless communications hubs and to analyze the received data.

Embodiments of the present invention provide methods for generating data pertaining to a relationship between a product and a particular customer and for providing targeted and dynamic advertisements to the customer. Methods according to such embodiments of the invention include transmitting sensor data acquired by one or more ICs to a plurality of wireless communication receivers, receiving the sensor data, transmitting the received sensor data to a computer and providing said sensor data as input to a machine learning algorithm and a localization algorithm. The methods according to such embodiments of the invention further include executing the machine learning algorithm in order to generate insights pertaining to the plurality of products on display and executing a localization algorithm in order to ascertain locations of the plurality of products on display and then using the insights pertaining to the plurality of products on display and the ascertained locations to generate advertisements pertaining to one or more of the products on display.

An embodiment of the present invention provides a method for generating data indicative of a customer interaction with a product on display. The method can additionally provide targeted advertisement. The method includes acquiring, by one or more sensors attached to a product on display in a product display area, sensor data, wirelessly transmitting the sensor data to at least one wireless receiver located in the vicinity of the product display area, transmitting the sensor data from the at least on wireless receiver to a computer, executing, by the computer, a machine learning algorithm in order to determine that a potential customer has interacted with the product on display and to generate insights about an interaction between the customer and the product on display. The method can additionally include generating, based on the insights, a targeted advertisement to the potential customer, and providing the targeted advertisement to the potential customer.

The method can further include executing, by the computer, a localization algorithm in order to determine a position of the product on display. Executing the localization algorithm can include analyzing, the computer, strengths of a signal by which the sensor data was wirelessly transmitted as measured by each of a plurality of wireless receivers and triangulating the position of the product on display based on the measured strengths of the signal.

The one or more sensors can include light sensors, magnetic sensors, accelerometers, and/or gyroscopes. The one or more sensors can be coupled to an integrated circuit (IC) attached to the product on display. The IC can include a system on a chip (SoC) capable of broadcasting advertising packets according to a Bluetooth Low Energy (BLE) specification. Wirelessly transmitting the sensor data to a plurality of wireless receivers located in the vicinity of the product display area can include broadcasting, by the SoC, advertising packets according to the BLE specification. The plurality of wireless receivers located in the vicinity of the product display area can be BLE receivers.

The insights about the interaction between the customer and the product on display includes an interaction time and/or a speed at which the product on display was moved.

Providing the targeted advertisement to the potential customer can include identifying, from a plurality of output devices, an output device that is located closest to the position of the product on display and providing the targeted advertisement at the output device that is located closes to the position of the product on display. The targeted advertisement can include audio, video, and/or still images.

An embodiment of the invention provides a system for generating data indicative of a customer interaction with product on display and for providing targeted advertisement. The system includes an integrated circuit (IC) attached to a product on display in a product display area, the IC being coupled to one or more sensors, the IC being configured to wirelessly transmit sensor data acquired by the one or more sensors to one or more wireless receivers located in the vicinity of the product display area. The system additionally includes the one or more wireless receivers, which are configured to receive the sensor data from the IC and to transmit the received sensor data to a processor. The system further includes the processor, which is configured to execute a machine learning algorithm in order to determine that a potential customer has interacted with the product on display to generate insights about an interaction between the customer and the product on display, and to generate, based on the insights, a targeted advertisement to the potential customer. In addition, the system includes an output device configured to provide the targeted advertisement to the potential customer. The computer can be further configured to execute a localization algorithm in order to determine a position of the product on display. The one or more sensors can include light sensors, magnetic sensors, accelerometers, and/or gyroscopes. The output device can includes a display screen and/or a speaker.

FIG. 1 depicts a system according to an embodiment of the invention for generating data pertaining to a customer-product relationship and for providing targeted advertisements to the customer. The system 100 includes digital signage in the form of display screens 102A, 102B, and 102C, a computer 104, a plurality of products 106A through 106F on display in a product display area, a plurality of ICs 106.1A through 106.1F attached to the plurality of products, and a plurality of wireless communication receivers 108A through 108I positioned around the display area.

Each of the plurality of ICs 106.1A through 106.1F is attached to a corresponding one of the plurality of products 106A through 106F and includes a wireless transmitter capable of transmitting wireless communications to the one or more wireless communication hubs or a wireless transceiver capable of transmitting and receiving wireless communications to and from the one or more wireless communications hubs. For example, each IC can include a system on a chip (SoC) capable of broadcasting advertising packets according to the Bluetooth Low Energy (BLE) specification, e.g. an nrf51822 SoC. In addition, the IC can further include one or more sensors. The plurality of sensors can include an inertial measurement sensor (e.g. an MPU-6050 sensor), a barometric sensor (e.g. a BMP180 sensor), and an ambient light proximity sensor (e.g. an AP3216 sensor). Alternatively or additionally, the one or more of the foregoing sensors or additional sensors can be wired to the IC.

The ICs 106.1A through 106.1F are configured to continuously broadcast, using BLE advertising, data received from the sensors that are a part thereof and/or attached thereto. The data broadcast by the ICs 106.1A through 106.1F is received by the wireless communication receivers 108A through 108I and then provided to the computer 104 as sensor input data. The plurality of wireless communication receivers 108A through 108I, which can be, e.g., Bluetooth receiving points, are positioned in a pattern that facilitates triangulation. The wireless communication receivers 108A through 108I are also connected to the computer 104.

Furthermore, because each of the plurality of products 106A through 106F has a corresponding one of the ICs 106.1A through 106.1F attached thereto, the system can also be used to alert store owners for possible object removal (e.g. theft).

The computer 104 includes a processor configured to execute IoT middleware and further configured to execute a machine learning algorithm and a localization algorithm. The computer 104 can be, e.g., a personal computer such as a Raspberry Pi and the IoT middleware can be, e.g., leafengine.

The IoT middleware provides access to the system components, e.g. wireless communication receivers 108A through 108I and thereby the ICs 106.1A through 106.1F. The IoT middleware further provides for the communication between the system components and the machine learning and localization algorithms executed by the computer 104. The IoT middleware specifically provides an API to get abstract access to all the information thereby facilitating quicker integration and development. The IoT middleware also aggregates the information generated by the machine learning algorithm and the localization algorithm (i.e. the insights and the locations of the plurality of products 106A through 106F) and provides that information to an advertisement generator located at the computer 104. The advertisement generator uses the information provided by the IoT middleware software to create advertisements targeted to a customer/potential customer who is interacting with or has interacted with one or more of the plurality of products 106A through 106F. The advertisements can include audio, video, and/or still images. Furthermore, the advertisements can be provided at one of the display screens 102A, 102B, and 102C that selected based on a location of a product that a customer or potential customer is presently interacting with. Moreover, the advertisements can be provided in a manner so as to follow the product (and therefore the customer/potential customer) as it moves in the vicinity of the product display area. The advertisement generator and/or the IoT middleware software can generate movement instructions to that end. Such movement instructions can be, e.g., high level descriptors and need not necessarily be specific coordinate values (i.e. left area, right area, screen 1, screen 2, top, bottom and not x=−100, y=150).

The machine learning algorithm is configured to receive, as input, the sensor input data broadcast by the ICs 106.1A through 106.1F and to generate, as output, insights pertaining to one or more of the plurality of products 106A through 106F. The localization algorithm is configured to receive, as input, signal strengths of the wireless communications received from ICs 106.1A through 106.1F by the wireless communication receivers 108A through 108I in order to triangulate the location of each of the plurality of ICs 106.1A through 106.1F, and thereby, each of the plurality of products 106A through 106F.

Figure 2:
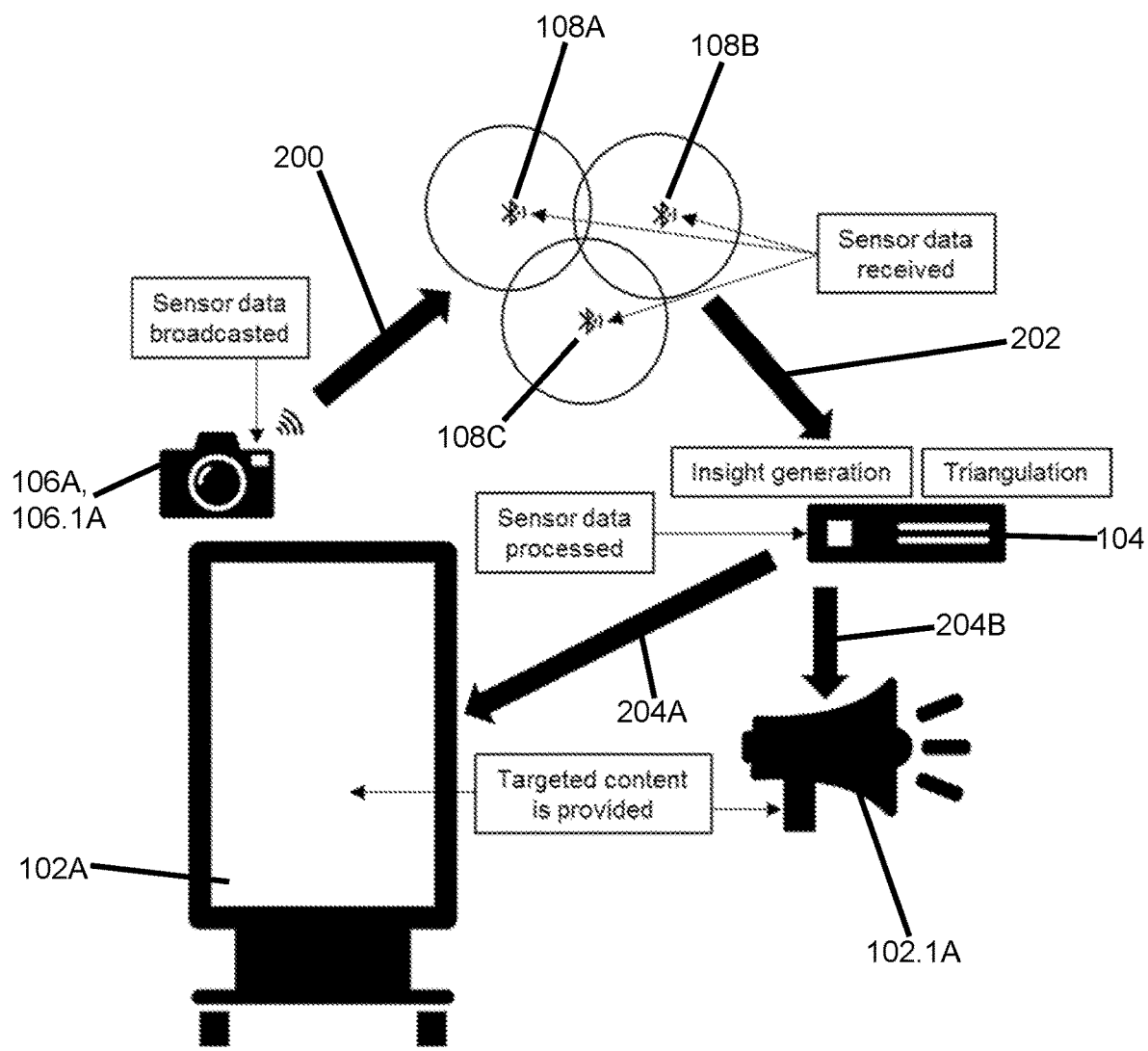
FIG. 2 depicts data flow in a system according to an embodiment of the invention for generating data pertaining to a customer-product relationship and for providing targeted advertisements to the customer.

FIG. 2 depicts data flow in a system according to an embodiment of the invention for generating data pertaining to a customer-product relationship and for providing targeted advertisements to the customer. As shown by arrow 200, data collected by sensors that are part of or connected to the IC 106.1A attached to the product 106A is transmitted by the IC 106.1A to wireless communication receivers 108A, 108B, and 108C. As shown by arrow 202, the sensor data received by wireless communication receivers 108A, 108B, and 108C is transmitted to the computer 104. The sensor data received by the computer 104 is then processed by the computer 104. Processing the sensor data can include fusing the sensor data by sensor fusion algorithms that the computer 104 is configured to execute. The sensor fusion algorithms can, e.g., aggregate all sensor data transmitted by a particular IC, e.g. IC 106.1A, in order to provide fused sensor data corresponding to one or more individuals products, e.g. product 106A. The fused sensor data (or one or more relevant portions thereof) is then provided as input to the machine learning algorithm and the localization algorithm.

The computer 104 is configured to execute the machine learning algorithm in order to provide further insights based on the data received from the sensors. For example, the machine learning algorithm can determine, based on the fused sensor data (i.e. the input data), whether one or more of the products 106A through 106F is moving or remaining at rest, being picked up or laid down by a customer, and/or laying on its side or standing up straight. In particular, the machine learning algorithm can determine, based on the input data, whether a customer/potential customer is currently and/or has recently interacted with one or more of the products, e.g. product 106A. The fused sensor data received by the machine learning algorithm includes the raw sensor data generated by the various sensors, e.g. accelerometers, gyroscopes, light, distance, pressure sensors, and others if available, coupled to one or more of the ICs 106.1A through 106.1F. The machine learning algorithm can then classify said input data into categories (e.g. object attitude, speed of movement, duration of status, etc.). A Naive Bayes Classification can be used for such classification, although other classification techniques can also be used. During the initial setup, the system can be trained under supervision.

In an embodiment of the invention, the machine learning algorithm is that represented by the following pseudocode:

```
let [ ][ ][ ] map be a 3 dimensional matrix representing XYZ shelf
centered coordinate system
for each reciever in recievers do
    for each obj in objects with bluetooth beacon do
        distance = converteRSSItoDistance(obj.RSSI)
        sphere = Sphere(reciever.location )
        for each point in map do
            if intersect(map,circf) == true
                point = point + RSSI
            end if
        end for
    end for
end for
location = maxValueIn(map)
```

After the classification of the data, the data can be provided as an input to a decision tree in order to decide what actions to perform (call support personnel, provide advertising pertaining to one or more of the products 106A through 106F, etc.). The initial decision tree can initially be set by a system integrator but can, over time, be fed with store sales related data. The knowledge about the customer interaction generated by the system 100 (e.g. which products customers interacted with and for how long) and data pertaining to the outcome of the customer interaction (e.g. sale or no sale of one or more of the products 106A through 106F) can be used to adapt the algorithm in order to maximize sales. For example, the sales data can be used to change both the classification parameters of the Bayes Classifier and the parameters of the decision tree.

The computer 104 is additionally configured to execute a localization algorithm in order to determine a location of one or more of the products 106A through 106F, e.g. product 106A. The localization algorithm analyzes signal strengths of wireless communications received by one or more of the wireless communication receivers 108A through 108I in order to triangulate the location of one or more of the plurality of ICs 106.1A through 106.1F, and thereby, one or more of the plurality of products 106A through 106F. Specifically, the localization algorithm receives as input combinations of a signal strength of a signal, a particular one of the plurality of wireless communication receivers 108A through 108F, and a product ID corresponding to the signal. Given known locations of the wireless communication receivers 108A through 108F, the localization algorithm can generate a value, for each element of a three dimensional matrix representing the three dimensional space in the vicinity of the product display area, that represents a likelihood of a product, e.g. product 106A, being in a location corresponding to the respective element of the three dimensional matrix. Higher values represent lower RSSI values whereas lower values represent high RSSI values. The values will be placed in a sphere, centered at the receiver position, which will have a radius equal to the calculated distance. The calculated distance D can be determined according to D=10^expo, where expo=(txPower−RSSI)/(10*K) and where K is a calibration value. In the end the localization algorithm can determine that the location of a particular product on display, e.g. product 106A, is the location represented by the matrix coordinate with the highest value.

In an embodiment of the invention, the localization algorithm is that represented by the following pseudocode:

```
struct movement contains
    duration    type float
```

```
    speed       type    float
    deltaPitch  type    float
    deltaRoll   type    float
    deltaYaw    type    float
end
let [ ]movements be the array representing all the movements
considered by our system
train movements as
    movement₁ = movement(d₁,s₁,dP₁,dR₁,dY₁)
    movement₂ = movement(d₂,s₂,dP₂,dR₂,dY₂)
    ...
    movementₙ = movement(dₙ,sₙ,dPₙ,dRₙ,dYₙ)
end
for each detection in detections do
    let [ ]p be the probabilities of a certain detection
    for each movement in movements do
        p.Append(p , P( detection | movement))
    end for
    detection.classification = max(p)
end for
```

After execution of the machine learning algorithm and the localization algorithm, the insights generated by the machine learning algorithm and the and the locations of the products determined by the localization algorithm are used to determine advertisements to provide and locations at which to provide them. The advertisements can include audio, video, and/or still images and can be provided via one of the display screens, e.g. display screen 102A, and via a speaker corresponding to such display screen, e.g. speaker 102.1A. As shown by arrows 204A and 204B, the advertisements to be provided are transmitted from the computer 104 to the display screen 102A and the speaker 102.1A, respectively.

Figure 3:
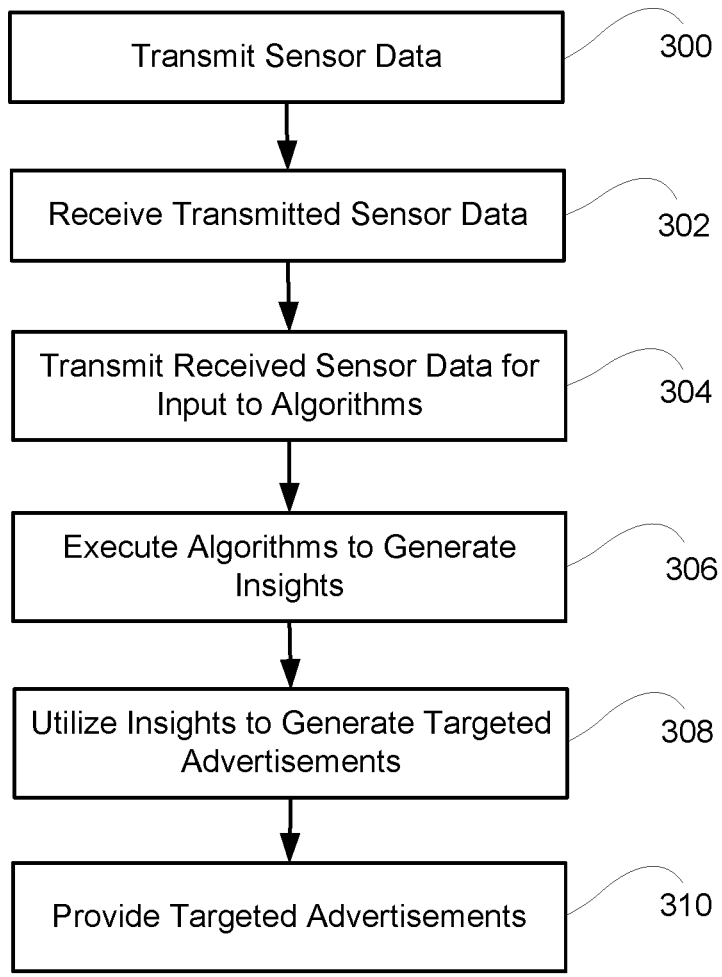
FIG. 3 is a flow chart depicting a method according to an embodiment of the invention for generating data pertaining to a customer-product relationship and for providing targeted advertisements to the customer.

FIG. 3 is a flow chart depicting a method according to an embodiment of the invention for generating data pertaining to a customer-product relationship and for providing targeted advertisements to the customer. At 300, a plurality of ICs, each being attached to one of a plurality of products on display, transmit sensor data to a plurality of wireless communication receivers. At 302, the plurality of wireless communication receivers receive the sensor data transmitted by the plurality of ICs. At 304, the sensor data received by the plurality of wireless communication receivers is transmitted to a computer and provided as input to a machine learning algorithm and a localization algorithm. At 306, the machine learning algorithm is executed in order to generate insights pertaining to the plurality of products on display and a localization algorithm is executed in order to ascertain locations of the plurality of products on display. At 308, the insights pertaining to the plurality of products on display and the ascertained locations are used to generate advertisements pertaining to one or more of the products on display. At 310, the generated advertisements are provided via one or more output devices.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for generating data indicative of a customer interaction with a product on display, the method comprising:
    acquiring, by one or more sensors attached to a product on display in a product display area, sensor data;
    wirelessly transmitting the sensor data to at least one wireless receiver located in the vicinity of the product display area;
    transmitting, as classification input data, the sensor data from the at least one wireless receiver to a computer;
    executing, by the computer, a machine learning algorithm configured to classify, using a Bayes Classification, the classification input data into categories in order to determine that a potential customer has interacted with the product on display and to generate data that parameterizes an interaction between the customer and the product on display.

2. The method according to claim 1, further comprising executing, by the computer, a localization algorithm in order to determine a position of the product on display, wherein the localization algorithm is a triangulation algorithm configured to triangulate a position of the product on display based on signal strengths of wireless communications received by the at least one wireless receiver.

3. The method according to claim 2, wherein executing the localization algorithm includes analyzing, the computer, the signal strengths by of the wireless communications received by the at least one wireless sensor, wherein the wireless communications received by the at least one wireless sensor are communications by which the sensor data was wirelessly transmitted to the at least one wireless receiver.

4. The method according to claim 1, wherein the one or more sensors include light sensors, magnetic sensors, accelerometers, and/or gyroscopes.

5. The method according to claim 1, wherein the one or more sensors are coupled to an integrated circuit (IC) attached to the product on display.

6. The method according to claim 5, wherein the IC includes a system on a chip (SoC) capable of broadcasting advertising packets according to a Bluetooth Low Energy (BLE) specification.

7. The method according to claim 6, wherein the wirelessly transmitting the sensor data to the at least one wireless receiver located in the vicinity of the product display area comprises broadcasting, by the SoC, advertising packets according to the BLE specification.

8. The method according to claim 7, wherein the plurality of wireless receivers located in the vicinity of the product display area are BLE receivers.

9. The method according to claim 1, wherein the interaction between the customer and the product on display is an initiation, by the customer, of a movement of the product on display, and wherein the data that parameterizes the interaction includes an interaction time and/or a speed at which the product on display was moved.

10. The method according to claim 2, further comprising providing a targeted advertisement to the potential customer, wherein providing the targeted advertisement includes identifying, from a plurality of output devices, an output device that is located closest to the position of the product on display and providing the targeted advertisement at the output device that is located closes to the position of the product on display.

11. The method according to claim 1, further comprising generating, based on the insights, a targeted advertisement to the potential customer; and
providing the targeted advertisement to the potential customer,
wherein the targeted advertisement includes audio, video, and/or still images.

12. A system for generating data indicative of a customer interaction with product on display and for providing targeted advertisement, the system comprising:
an integrated circuit (IC) attached to a product on display in a product display area, the IC being coupled to one or more sensors, the IC being configured to wirelessly transmit sensor data acquired by the one or more sensors to one or more wireless receivers located in the vicinity of the product display area;
the one or more wireless receivers, the one or more wireless receivers being configured to receive the sensor data from the IC and to transmit, as classification input data, the received sensor data to a processor;
the processor, configured to execute a machine learning algorithm configured to classify, using a Bayes Classification, the classification input data into categories in order to determine that a potential customer has interacted with the product on display to generate data that parameterizes an interaction between the customer and the product on display, and to generate, based on the insights, a targeted advertisement to the potential customer; and
an output device configured to provide the targeted advertisement to the potential customer.

13. The system according to claim 12, wherein the computer is further configured to execute a localization algorithm in order to determine a position of the product on display, wherein the localization algorithm is a triangulation algorithm configured to triangulate a position of the product on display based on signal strengths of wireless communications received by the at least one wireless receiver.

14. The system according to claim 12, wherein the one or more sensors include light sensors, magnetic sensors, accelerometers, and/or gyroscopes.

15. The system according to claim 12, wherein the output device includes a display screen and/or a speaker.

16. The system according to claim 12, wherein the interaction between the customer and the product on display is an initiation, by the customer, of a movement of the product on display, and wherein the data that parameterizes the interaction includes an interaction time and/or a speed at which the product on display was moved.

* * * * *